United States Patent [19]

Nahay

[11] 3,740,669

[45] June 19, 1973

[54] M-ARY FSK DIGITAL MODULATOR

[75] Inventor: Lawrence Paul Nahay, Cinnaminson, N.J.

[73] Assignee: RCA Corporation, New York, N.Y.

[22] Filed: Nov. 1, 1971

[21] Appl. No.: 194,429

[52] U.S. Cl. .............. 332/11 R, 178/66 R, 325/163

[51] Int. Cl. .............................................. H04l 27/12

[58] Field of Search .................. 332/9 R, 9 J, 11 R; 331/179, 47; 325/163; 178/66 R

[56] References Cited

UNITED STATES PATENTS

| | | | |
|---|---|---|---|
| 3,668,562 | 6/1972 | Fritkin | 332/9 R |
| 3,421,088 | 1/1969 | Salley et al. | 332/16 X |
| 3,493,866 | 2/1970 | Miller | 325/163 X |
| 3,626,315 | 12/1971 | Stirling | 331/179 |
| 3,636,477 | 1/1972 | Selz | 332/9 R X |

*Primary Examiner*—Alfred L. Brody
*Attorney*—Edward J. Norton

[57] ABSTRACT

A M-ARY digital modulator for phase continuous frequency shift keying a digital data signal includes a pulse train generator for frequency encoding the data signal and a waveform generator for generating by synthetic means an alternating signal the frequency of which is determined by the frequency of the pulse train applied thereto and whose shape being derived synthetically is independent of the waveshape of the frequency encoded pulse train.

3 Claims, 5 Drawing Figures

INVENTOR.
LAWRENCE P. NAHAY
BY
ATTORNEY

PATENTED JUN 19 1973 3,740,669

SHEET 2 OF 3

INVENTOR.
LAWRENCE P. NAHAY
BY
ATTORNEY

INVENTOR.
LAWRENCE P. NAHAY
BY
ATTORNEY

M-ARY FSK DIGITAL MODULATOR

FIELD OF THE INVENTION

This invention relates to digital modulation and more particularly to digital modulation techniques employing frequency shift keying

BACKGROUND OF THE INVENTION

The transmission of digital data over voice communication circuits is an important aspect of many modern electronic systems. These systems include computers, data processing equipment, and many other devices which must frequently be interconnected over existing voice grade communication facilities, namely, telephone lines. However, the transmission characteristics of the typical voice communication circuit are not suitable for the direct transmission of the signals in the form most efficiently processed by such electronic systems. For example, the steady-state or d.c. level is an important component of the usual digital signals, and provisions must be made for the transmission of frequency components down to and including zero frequency, which is beyond the transmission capability of the ordinary voice transmission circuits. Additionally, the high frequency components such as those higher than 3 $kH_z$ are also beyond the transmission capability of these transmission circuits. Thus there arises the need for converting the binary data signal which is most efficiently used by these electronic systems into a signal that is compatible with the transmission system.

One form of transmission that has found wide spread acceptance is frequency shift keying (FSK) wherein a number of signals, usually two when a binary system is used, having separate discrete audio frequencies compatible with the transmission system are each assigned a separate, different symbol identification portion of the data signal. For example, in an on-off or mark-space data signal, the mark is assigned a first frequency while the space is assigned a second frequency. In these FSK systems the frequency of the signal to be transmitted is shifted from the first frequency to the second frequency as a function of the mark and space symbol identification in the data signal.

However, the FSK systems that have been developed have not been without their inherent problems. Where the FSK waves are provided by separate sine wave oscillators, the shifting between frequencies causes phase discontinuities, reducing the dependability of the transmission. Where a phase controlled oscillator is used to provide phase continuity when shifting between frequencies, these types of oscillators are subject to temperature variations and drift, adding to the unreliability of the transmitted signal.

Other FSK systems have been developed utilizing all digital techniques to avoid the problems associated with the analog or sine wave generating oscillator. These other techniques include generating rectangular waveforms at the desired frequencies by straight count-down from a single crystal controlled oscillator and then keying the frequency of the waveform in accordance with the level of the binary data signal. However, this technique also includes filtering means for converting the relatively wide bandwidth rectangular wave to a relatively narrow bandwidth sine wave suitable for transmission over telephone lines. This conversion imposes limitations on the signal to be transmitted with respect to the relationship between the deviation between the frequencies being shifted and the data rate which relationship is defined as the deviation ratio (*dr*) = ($f_1-f_2/f$ data). That is, the spectral density of a random binary FSK wave with continuous phase at the transitions will vary in accordance with this deviation ratio. This is discussed in "Spectral Density and Autocorrelation Functions Associated with Binary Frequency-Shift Keying" by W.R. Bennett and S. O. Rice, *The Bell System Technical Journal*, September, 1963.

As a result of this varying spectral density of the transmitted data signal, an additional problem occurs known as "spillover" from lower sidelobe components from harmonics. When the deviation ratio approaches unity or less, e.g. $< 0.75$, the lower sidelobe frequency components from the modulated harmonics ($3f_1$, $3f_2$, $5f_1$ etc.) spill over into the desired spectrum. Filtering of the rectangular waveform passes all signals within the bandwidth of the filter and, therefore, the spillover as well as possibly the third harmonic components are also passed. This causes considerably distortion in the signal making it unsuitable for transmission thus imposing a limitation on the maximum frequency of the data signal. In essence, energy is displaced in the frequency domain which reduces the signal's detection characteristics at the receiver. Additionally, the amplitudes of the various signals are different, power limiting the weaker signals and decreasing the transmission efficiency of the system.

SUMMARY OF THE INVENTION

In contrast to the above-described systems in which the signal to be transmitted over the transmission system remains substantially unchanged in wave shape when using an analog type of oscillator or else in the other system wherein the wave shape is filtered and modified in order to process the signal over a transmission system, the present invention provides a digitally controlled oscillator for generating a signal whose frequency is determined by the value manifested by the applied data digital signal. This digitally controlled oscillator includes a pulse train generator for selectively generating a first or second train of pulses each having a different pulse repetition rate.

The frequency of the signal selected is determined in accordance with the value of the digital data signal in order to frequency shift key that selected signal. A waveform generator is coupled to the pulse train generator and is responsive to the selected train of pulses applied thereto for generating an alternating signal having a frequency which is proportional to the pulse repetition rate of the selected pulse train being applied. The alternating signal is thus frequency shift keyed in accordance with the value manifested by the data signal. Consequently, the spectral overlapping problem accompanying the filtering of a rectangular wave as indicated above and the instability problem associated with an analog oscillator are substantially eliminated.

IN THE DRAWINGS

Figure 3:
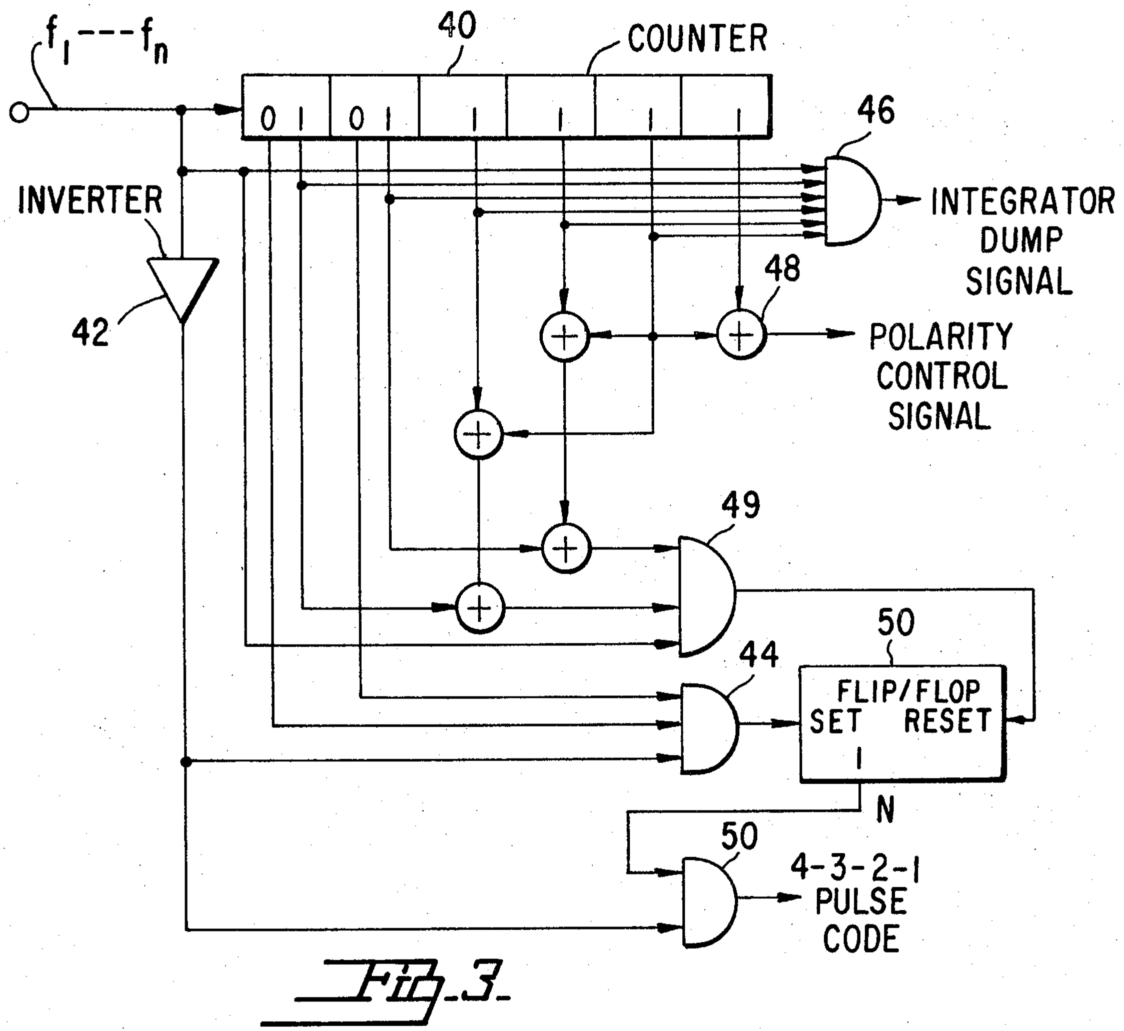
FIG. 3 is a block diagram of an encoder that is used in the oscillator of FIG. 1.
Figure 4A:
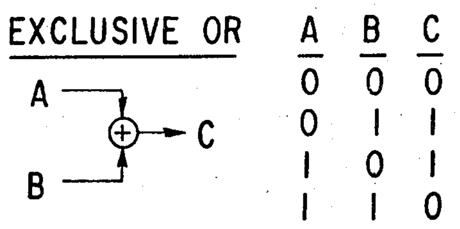
Figure 4B:
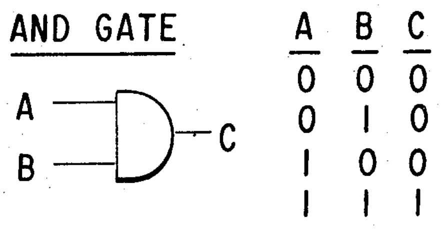

FIGS. 4*a* and 4*b* are two truth tables of certain of the logic elements of FIG. 3.

DESCRIPTION OF THE INVENTION

Figure 1:
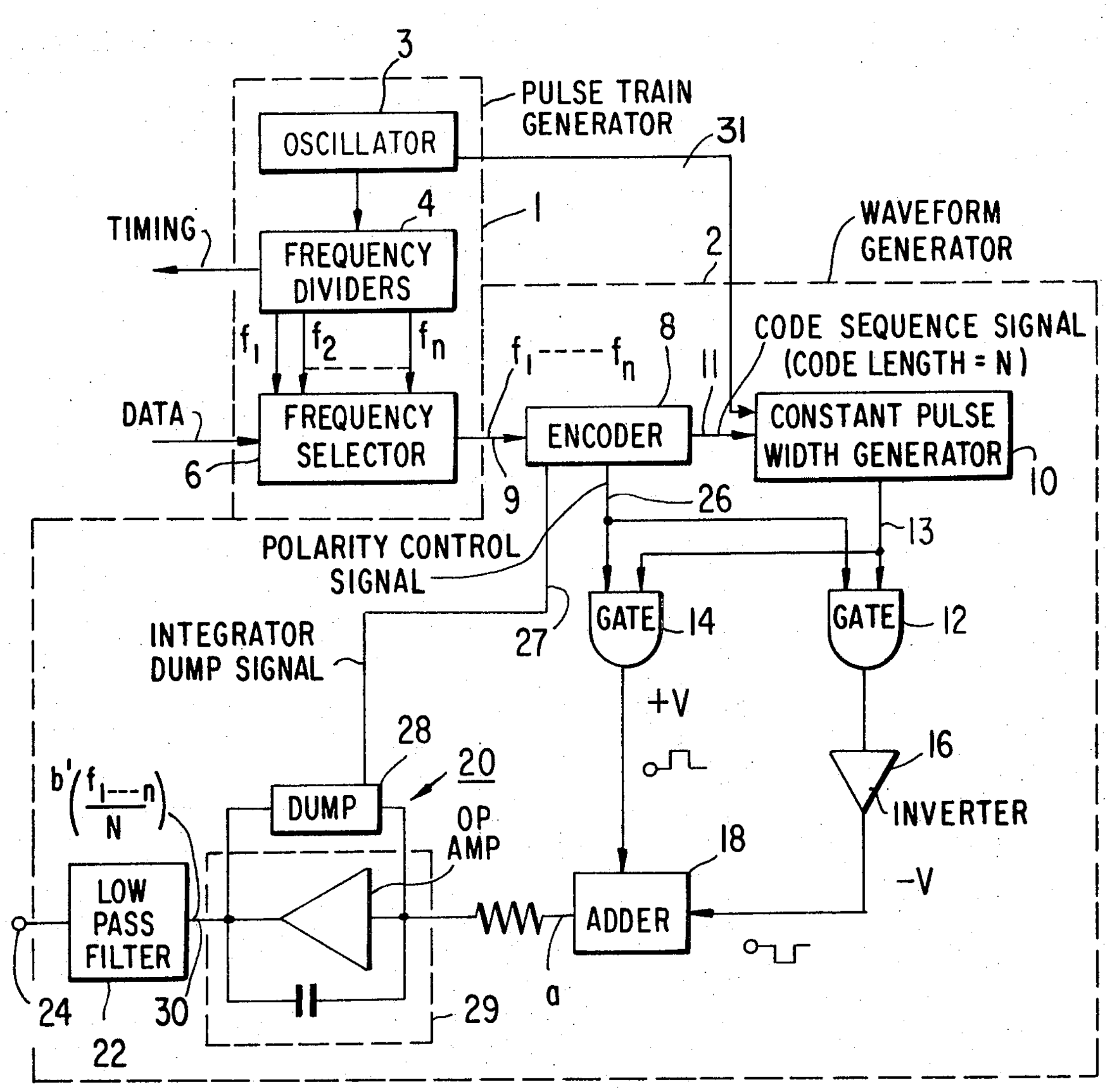
FIG. 1 is a block diagram of an oscillator according to the invention.

In FIG. 1, an embodiment of the present invention comprises pulse train generator 1 and waveform generator 2 coupled thereto. Pulse train generator 1 comprises oscillator 3, frequency divider 4 and frequency selector 6. Waveform generator 2 comprises an encoder 8 responsive to a signal whose frequency is selected by frequency selector 6 along lead 9, constant pulse width generator 10, AND gates 12 and 14, inverter 16, adder 18, integrator and dump circuit 20, and low pass filter 22. Except for encoder 8 which is described in further detail with reference to FIGS. 2, 3 and 4a and 4b, no further description of the details of each of the illustrated circuit blocks as described hereinafter will be given as they are well known in various modifications to those skilled in the art of digital communications and data processing.

Oscillator 3 is a crystal controlled oscillator for generating an a.c. voltage at a suitable frequency. The frequency of oscillator 3 is set sufficiently high such that the frequency of the modulated output signal at output terminal 24 is at the desired modulated frequency, for example, 1300 bits per second and 2100 bits per second.

Frequency divider 4 provides a signal having a plurality of frequencies, $f_1 \ldots f_n$ which could be any plurality as desired for a particular application. In practice, for frequency shift keying a two level data signal, two frequencies $f_1$ and $f_2$ are utilized. Each signal of the different frequencies from divider 4 is applied to frequency selector 6, which selects a particular one of these applied signals in accordance with the level of a data input signal then being applied to frequency selector 6. In essence, the signal applied to lead 9 is a so called frequency shift keyed signal wherein each frequency, $f_1$ and $f_2$ manifest a different level of the two level data signal. The important characteristics of the pulses in the signal at lead 9 are the precision of their frequency which is the function of the precision of a suitable crystal controlled oscillator 3 and the sharpness of the respective rise and fall times of the leading or lagging edges of each of the pulses which are utilized in enabling the logic of encoder 8 for synthetically deriving the desired waveform as will be explained.

It is to be understood that the signal applied to output lead 9 is not suitable for transmission over conventional voice grade communication circuits and that this signal must be made compatible with these transmission systems. Consequently, as provided in accordance with the present invention a synthetic waveform is derived in which only the frequency thereof is related to the so called frequency shift keyed signal at lead 9, the form of the derived waveform being independent of the form of that FSK signal.

Waveform generator 2 in response to the pulses applied thereto at lead 9 synthetically generates an alternating signal by digital means wherein the frequency of the derived signal is proportional to the pulse repetition rate of the selected pulse train then being applied thereto. It is to be understood that waveform generators are well known and may take many forms. However, a brief discussion will be made with respect to the waveform generator 2 to illustrate one preferred embodiment of the present invention.

Encoder 8 of generator 2 applies to lead 11 a continuous stream of pulses of the same polarity and of the same repetition rate for a given frequency of a signal applied at the input thereto from frequency selector 6. Encoder 8 generates this stream of pulses in an encoded pulse sequence having a given code length of N pulses wherein the code comprises blanking out certain of the pulses in the code length N such that the remaining pulses form a signal whose pulses are time-spaced positioned encoded in the period comprising N pulses. This time-space pulse position code is repeated in contiguous periods to form a single stream of encoded pulses.

Figure 2:
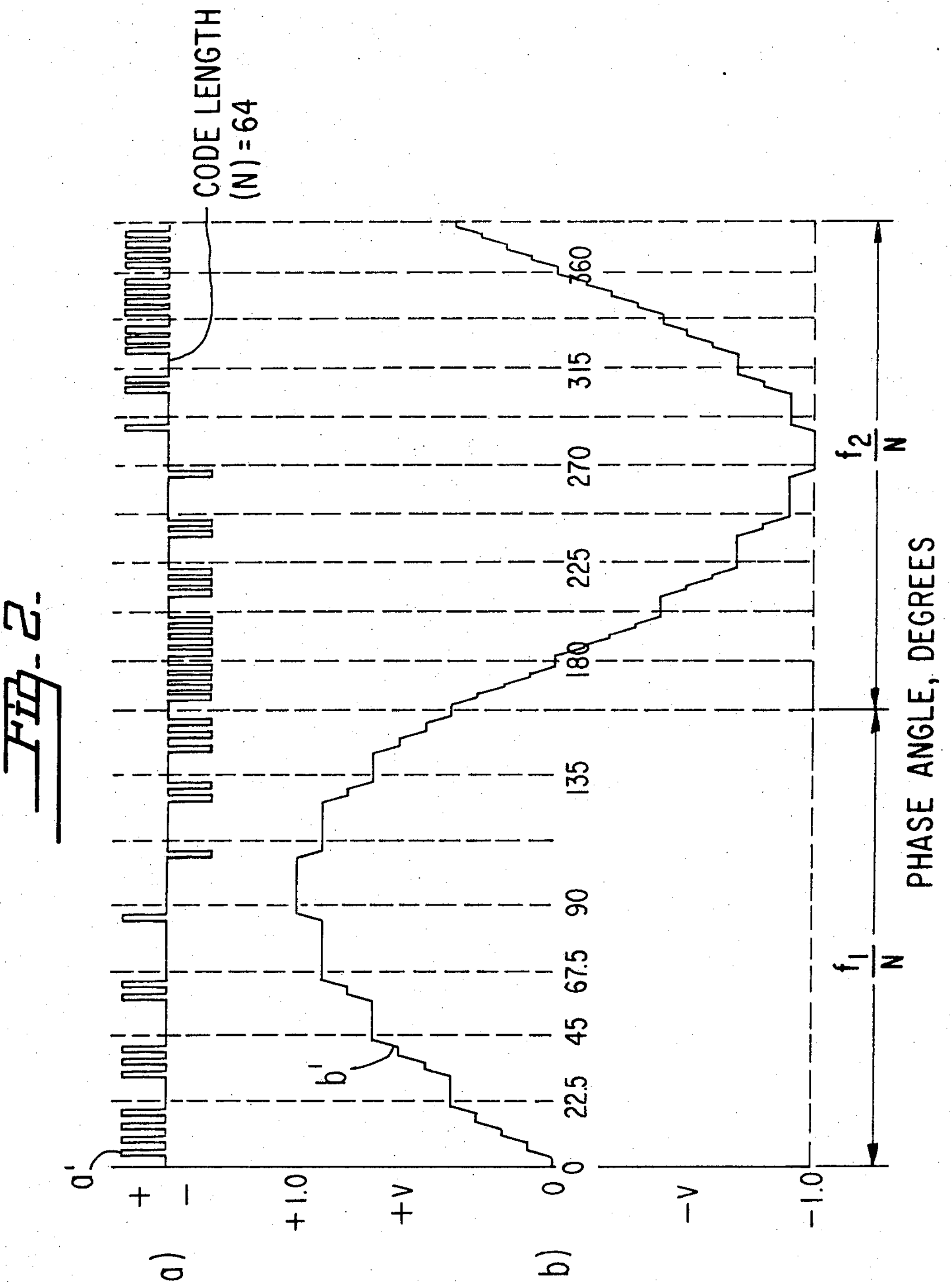
FIG. 2 is a graph of a waveform that is generated by the oscillator of FIG. 1 and is useful in explaining the embodiment of FIG. 1.

An example of the code used to generate a sine wave is shown by the pulses *a'* of line *a*, FIG. 2. Ignoring for the moment the differences in polarity of the pulses, such that the polarity is the same throughout, the code is clearly shown for the period from 0° to 360°. As seen in FIG. 2, between 0° and 22½° four pulses occur, while between 22½° and 45° three pulses occur with one pulse blanked out between the two sets, between 45° and 67.5° two pulses occur with two pulses blanked out and between 67.5° and 90° one pulse occurs with three pulses blanked out. The sequence then continues in reverse order as illustrated for every 90°. It can be seen in FIG. 2 that each cycle of waveform *b'* is divided into 16 22½° increments. Pulses *a'* of each 22½° increment are spaced from the pulse *a'* of the next adjacent increment by the blanked out pulses as illustrated to provide relatively smooth sine wave when pulses provided in accordance with this code are integrated in a manner to be described. In this case, the code length N is 64 which is the number of *a'* pulse cycles which occur in each 0°–360° period.

For every frequency $f_1$ through $f_n$, in the general case, applied to the encoder, pulses *a'* will be provided at substantially the same respective frequency $f_1$ through $f_n$ then being applied from frequency selector 6. However, since 64 *a'* pulse cycles form a single sine wave cycle of waveform *b'*, then the frequency of sine wave *b'* will be one sixty-fourth the frequency $f_1$ through $f_n$.

pulse width generator 10 is responsive to the encoded signal to provide for each encoded pulse generated by encoder 8 a pulse of constant width and amplitude. The constant width may be established by a fixed count of pulses derived from oscillator 3 over lead 31 or any suitable alternate technique. The pulse width must be less than the period of the highest frequency $f_n$ on lead 9. This insures that each of the pulses, which are subsequently integrated to form the alternating wave to be derived, are substantially uniform in energy to provide an alternating signal of a constant energy level regardless of the frequency of the signal. This avoids the problem of power limiting the weakest signal such as occurs in prior art FSK systems when differences in energy levels are invariably present in the different frequency signals. The pulse width at the output lead 11 of encoder 8 varies inversely with frequency $f_1$–$f_n$.

As indicated, the pulses *a'* applied to lead 11 of encoder 8 are all of the same polarity when applied to constant pulse width generator 10. Thus, the output signal of pulse width generator 10 at lead 13 which is applied to AND gates 14 and 12 is also the same polarity. The polarity of the pulses between 90° and 270° are provided opposite the polarity of the pulse between 270° to generate the desired sine wave and is accomplished by conventional gates 12 and 14, inverter 16 and adder 18 in response to a polarity control signal from encoder 8 at output lead 26. The polarity control signal enables one of two gates, either gate 12 or gate 14, passing the constant pulse width pulse of generator 10 to inverter 16 and adder 18, respectively. Thus, in one-half of the alternating signal cycle, gate 14 is enabled, while in the second half of that cycle, gate 12 is enabled. Adder 18 then adds the positive and negative pulses from gate 14 and inverter 16, respectively, to form the waveform of curve a, FIG. 2. This waveform is applied to a conventional integrator and dump circuit 20 which includes integrator 29 and dump circuit 28.

Encoder 8 has a third output at lead 27 on which the integrator dump signal is provided once every half cycle of the alternating signal or every 180° in time coincidence with the zero crossover point of the alternating signal. This dump signal is applied to dump circuit 28 which discharges any residual energy left in integrator 29 at the zero crossover point of the alternating signal to avoid drift and offset. At output 30 of the integrator and dump circuit 20, there appears the waveform *b'* of FIG. 2 which approximates an alternating sine wave. Low pass filter 22 filters out the ripples in waveform *b'* to provide a smooth sine wave at output terminal 24 of the waveform generator. It is clear that the frequency of waveform b' is $f_1$ or $f_2$ divided by N, the code length of the code sequence signal of encoder 8, depending upon the binary level of the data signal applied to selector 6.

It will be appreciated that the code 4–3–2–1 of FIG. 2 is illustrative and other code lengths N may be provided. For example, by making the code length N=192 instead of 64 and using a 12–9–6–3 code instead of a 4–3–2–1 code, a more ideal sine wave may be generated. In any case, the frequency of crystal oscillator 3 is suitably selected so that upon division by divider 4 and subsequent division by encoder 8, the output frequency of the waveform generator will be at the desired mark and space frequencies. For the N=64 example, where the bit rate is 1200 bits/second and the output frequencies of the derived signal at terminal 24 are 1300 and 2100 $H_z$, oscillator 3 is provided, according to the invention, a suitable frequency of 3,744 $kH_z$ which is divided down by divider 4 into two signals at output 9 having respective frequencies of 83.3 $kH_z$ and 134.4 $kH_z$ which correspond to the 1300 $H_z$ and 2100 $H_z$ output frequencies, respectively. Waveform *b'* of FIG. 2 illustrates the phase continuous shifting of frequency at 157.5° between the frequencies in the period $f_1/N$ and $F_2/N$, where $f_1$ is the 83.3 $kH_z$ signal and $f_2$ is the 134.4 $kH_z$ signal, and N=64.

A suitable timing signal is preferably derived from the frequency dividers 4 for timing the oscillator to the applied data signal.

An example of an encoder 8 which is utilized to generate the code sequence signal of code length 64 is illustrated in FIG. 3. In FIG. 3, frequencies $f_1$ and $f_2$, selected in accordance with the applied data signal, are applied to a six stage counter 40 and inverter 42. The high outputs of each stage of the counter are applied to a set of exclusive OR gates as shown in FIG. 3, the truth table of which is illustrated in FIG. 4*a*. The low output of the first two stages of the counter and the output of inverter 42 are applied to the input of AND gate 44, the truth table of which is shown in FIG. 4*b*. The high outputs of the first five stages of counter 40 and the lead 9 of the frequency selector are connected to the input of AND gate 46 whose output provides the integrator dump signal, which is a narrow pulse provided every 180° as described above.

The output of exclusive OR gate 48 provides the polarity control signal which is a two level signal which, as indicated above, shifts in level every 180° to reverse the polarity of the pulses *a'* of the encoded signal. The outputs of AND gates 44 and 49 are respectively applied to the set and reset inputs of flip-flop 50. The high output of the flip-flop is applied to the AND gate 50 as is the inverted signal from inverter 42. The output of AND gate 50 is pulse sequence code that is applied to output lead 11 of encoder 8 of FIG. 1. Thus, it is seen that the digital logic of encoder 8 need only be responsive to either the leading or lagging edges of the signal at lead 9 and the shape of the remainder of the waveform is not critical to the operation of encoder 8. Further details of the logic arrangements and timing cycles will not be given as these are known techniques.

Thus, the invention provides an apparatus for generation of successive pulses or bursts of electric oscillations of two frequencies (or more) by means of a single crystal controlled oscillator. Since there is no filtering of a rectangular waveform, there are very little harmonics with lower sidelobe components that overlap the main energy spectrum which may be passed along to the transmission line introducing distortion into the signal. Since a crystal controlled oscillator is utilized, drift and temperature compensation problems associated with analog type oscillators for generating sine waves are not a factor for consideration. Additionally, the energy levels of the different frequency signals are substantially the same.

As seen in FIG. 2, the sine wave b' is phase continuous at the point of frequency shift which is shown to occur at 157.5°. Phase continuity is always present regardless at which point the frequency is shifted since it is clear that the code sequence of curve a of FIG. 2 continues regardless of the frequency of occurrence of the pulses *a'*. Thus, not only may two frequencies be provided but M frequencies may be generated, all being shifted with phase continuous distortion less waveforms. The result is that the spectrum spillover from sidelobes of harmonics when the data rate and the deviation between the frequencies $f_1$ and $f_2$, for example, approaches 1 as discussed above is avoided. Thus, higher data rates for a given deviation of the shifted frequencies is provided by an apparatus in accordance with the present invention over the data rates of prior art systems.

What is claimed is:

1. A digitally controlled oscillator for generating a signal whose frequency is determined by the value manifested by an applied digital signal, comprising:

pulse train generator means having said digital signal applied thereto for selectively generating either a first train of pulses having a first discrete pulse repetition rate or a second train of pulses having a second discrete pulse repetition rate different from said first pulse repetition rate in accordance with the value of said signal, and waveform generating means coupled to said pulse train generator means responsive to the selective train of pulses which is applied thereto for generating an alternating signal having a frequency which is proportional to the pulse repetition rate of the selected pulse train then being applied thereto, said waveform generating means comprising, pulse train encoding means responsive to said first and second trains of pulses applied as an input signal for a priori periodically blanking each of selected ones of said pulses in the same given ordinal position in each of a plurality of contiguous time periods regardless of the pulse repetition rate of that train then being encoded to form a periodic pulse position encoded train of pulses said periodic encoded train of pulses having a period whose repetition rate is 1/N times the pulse repetition rate of the train of pulses then being applied to said encoding means where N is the number of pulses in said first and second trains of pulses occurring in each said time periods, constant pulse width generator means responsive to said periodic encoded train of pulses applied thereto for generating a separate, different rectangular pulse corresponding to each different pulse in said periodic train of pulses, each generated rectangular pulse having the same time duration, polarity control means responsive to said first and second trains of pulses and said generated rectangular pulse applied as input signals thereto for generating as an output signal said rectangular pulse whose polarity periodically changes in a period of 1/2N, and integrating means for integrating said rectangular pulses of said output signal regardless the changed polarity thereof applied as in input signal to thereby synthetically generate said alternating signal.

2. The oscillator of claim 1 wherein said encoding means includes a binary counter having a plurality of counting stages each stage having an output terminal at which appears a signal manifesting one level of a two level signal, and pulse blanking means coupled to said counter output terminals and responsive to said two levels signal thereat to produce a pulse blanking signal for blanking certain pulses in said first and second pulse trains applied thereto in accordance with the ordinal position of said certain pulses then being applied to said encoding means.

3. The oscillator of claim 2 wherein said pulse blanking means includes a first plurality of exclusive OR gates each having a pair of input terminals and an output terminal, said first plurality of OR gate input terminals being connected to selected ones of said counting stage output terminals, a second plurality of exclusive OR gates each having a pair of input terminals and an output terminal, each said second plurality of OR gates having one of their input terminals connected to an output terminal of a different one of said first OR gates and the other input terminal to a respective different counter output terminal, an AND gate having a plurality of input terminals and an output terminal, said second OR gates each having their respective output terminals connected to a separate, different one of said AND gate input terminals for generating a pulse blanking signal having a given time of occurrence, and logic means including gate means responsive to said pulse blanking signal and said first and second trains of pulses applied as input signals thereto for blanking selected ones of the pulses in said first and second trains in accordance with the time of occurrence of said pulse blanking signal.

* * * * *